United States Patent
Stevenson et al.

(10) Patent No.: US 6,729,531 B2
(45) Date of Patent: May 4, 2004

(54) FASTENER AND A METHOD FOR ATTACHING METAL MEMBERS THEREWITH

(75) Inventors: Robin Stevenson, Bloomfield, MI (US); Pei-Chung Wang, Troy, MI (US)

(73) Assignee: General Motors Corporation, Detroit, MI (US)

(*) Notice: Subject to any disclaimer, the term of this patent is extended or adjusted under 35 U.S.C. 154(b) by 42 days.

(21) Appl. No.: 10/123,752

(22) Filed: Apr. 16, 2002

(65) Prior Publication Data

US 2003/0192940 A1 Oct. 16, 2003

(51) Int. Cl.$^7$ .................. B23K 31/02; B23K 20/12; B23K 37/00
(52) U.S. Cl. .................. 228/112.1; 228/2.1; 228/114.5; 411/453
(58) Field of Search .................. 228/112.1, 2.1, 228/114.5; 411/453

(56) References Cited

U.S. PATENT DOCUMENTS

| | | | |
|---|---|---|---|
| 4,300,379 A | * 11/1981 | Johnson et al. | 72/258 |
| 4,850,772 A | 7/1989 | Jenkins | |
| 5,375,957 A | * 12/1994 | Golledge | 411/453 |
| 5,469,617 A | * 11/1995 | Thomas et al. | 29/889.21 |
| 5,675,619 A | * 10/1997 | Erbes et al. | 376/302 |
| 5,971,252 A | 10/1999 | Rosen et al. | |
| 5,975,406 A | 11/1999 | Mahoney et al. | |
| 6,053,391 A | 4/2000 | Heideman et al. | |
| 6,138,895 A | 10/2000 | Oelgoetz et al. | |
| 6,206,268 B1 | 3/2001 | Mahoney | |
| 6,213,379 B1 | * 4/2001 | Takeshita et al. | 228/112.1 |
| 6,227,430 B1 | 5/2001 | Rosen et al. | |
| 6,264,088 B1 | 7/2001 | Larsson | |
| 6,572,007 B1 | * 6/2003 | Stevenson et al. | 228/112.1 |
| 2002/0027156 A1 | * 3/2002 | Coletta et al. | 228/114.5 |
| 2002/0071741 A1 | * 6/2002 | Oswald | 411/453 |
| 2002/0125297 A1 | * 9/2002 | Stol et al. | 228/112.1 |

OTHER PUBLICATIONS

Copending U.S. Application entitled "A Method for Attaching Metal Members", Serial No. To Be Assigned.
Copending U.S. Application entitled "A Method for Attaching Metal Members", Serial No. To Be Assigned.
Copending U.S. Application entitled "A Method for Attaching Metal Members", Serial No. To Be Assigned.

* cited by examiner

*Primary Examiner*—L. Edmondson
(74) *Attorney, Agent, or Firm*—Kathryn A. Marra

(57) ABSTRACT

A first metal member is contacted with a second metal member. A metal fastener is provided including a core and a cladding disposed upon the core. The fastener is driven through the first member and into the second member, inducing friction between the fastener, the first member and the second member for at least locally melting portions of the cladding, the first member and the second member to form a flowable material that solidifies and metallurgically bonds the fastener to the first member and the second member for attaching the members together.

20 Claims, 2 Drawing Sheets

FASTENER AND A METHOD FOR ATTACHING METAL MEMBERS THEREWITH

TECHNICAL FIELD

The present invention relates to a fastener and a method for attaching metal members therewith for assembling automotive vehicle structures.

BACKGROUND OF THE INVENTION

It is known that the manufacture of automotive vehicles often requires that metal members be attached to each other for forming automotive vehicle structures. Friction stir welding is one potential method of attaching metal members. Conventional friction stir welding typically requires a rotating tool to be translated along an interface between surfaces of metal members for softening or melting portions of the members at the interface. In turn, the softened or melted portions intermix and harden to form metallurgical bonds between the members. During a conventional friction stir welding process, however, amounts of liquidized material may be lost or unused. Moreover, it may be difficult to conventionally friction stir weld relatively thick members, since thicker members tend to dissipate heat relatively quickly thereby frustrating desired intermixing of liquidized material for forming metallurgical bonds. Thus, there is a need for improved techniques, fasteners or both, alternative to conventional friction stir welding for achieving high integrity attachment of metal members.

SUMMARY OF THE INVENTION

The present invention meets these needs by providing an improved fastener for attaching metal members and an improved method for attaching metal members with the fastener. The fastener and method find particular utility in the formation of components for an automotive vehicle.

According to the method, a first metal member is provided and contacted with a second metal member. A metal fastener is also provided. The fastener is substantially symmetrical about a central axis and includes a radially enlarged cap portion and a shank portion extending from the cap portion. The fastener also includes a core with a cladding covering at least a portion of an outer peripheral surface of the core wherein the cladding is metallurgically bonded with the core. Once provided, the metal fastener is rotated about the axis using a rotary driving apparatus and the fastener is driven through the first member and into the second member during rotation. In turn, friction is induced between the fastener, the first member and the second member for at least locally melting portions of the cladding, the first member and the second member to form a flowable material about the fastener. Preferably, the melted portions of the cladding alloy with the melted portions of the first and second members to metallurgically bond the first and second metal members to the fastener. The flowable material is solidified to integrally attach the flowable material to the first member and second member with a metallurgical bond.

The fastener is adapted to be driven through a sheet and into a substrate. Accordingly, the fastener includes a core with an outer peripheral surface, the core being formed of a refractory metal with a melting point higher than the sheet or the substrate. The fastener also includes a cladding disposed upon a substantial portion of the outer peripheral surface, the cladding being a metal alloy. Additionally, the fastener has a substantially disk-shaped cap portion with a non-circular cavity disposed therein and has a substantially cylindrical shank portion with a leading surface. Preferably, the fastener is substantially symmetrical about a central axis.

BRIEF DESCRIPTION OF THE DRAWINGS

These and other aspects and advantages of the present invention will become apparent upon reading the following detailed description in combination with the accompanying drawings, in which.

DETAILED DESCRIPTION OF THE PREFERRED EMBODIMENT

Figure 1:
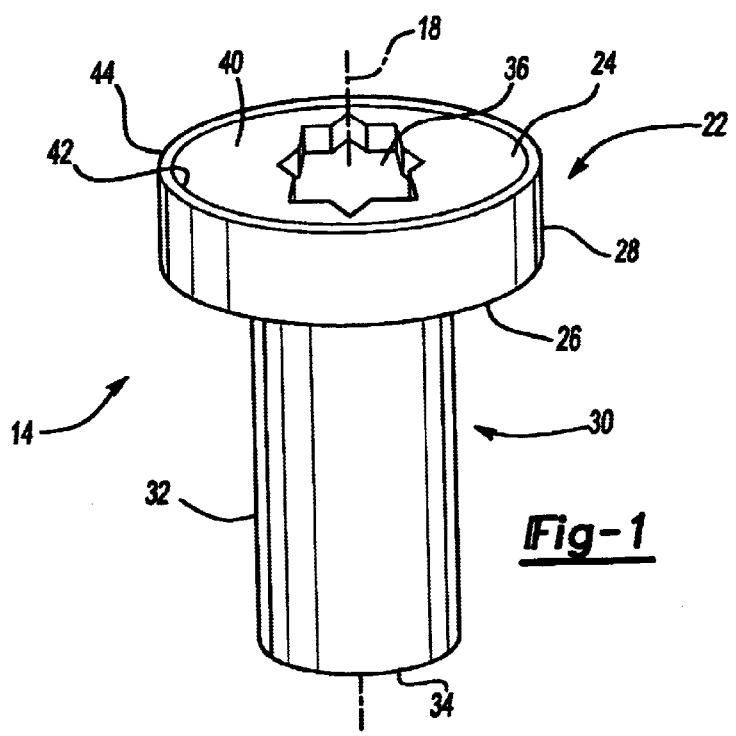
FIG. 1 illustrates a metal fastener for attaching metal members.
Figure 2:
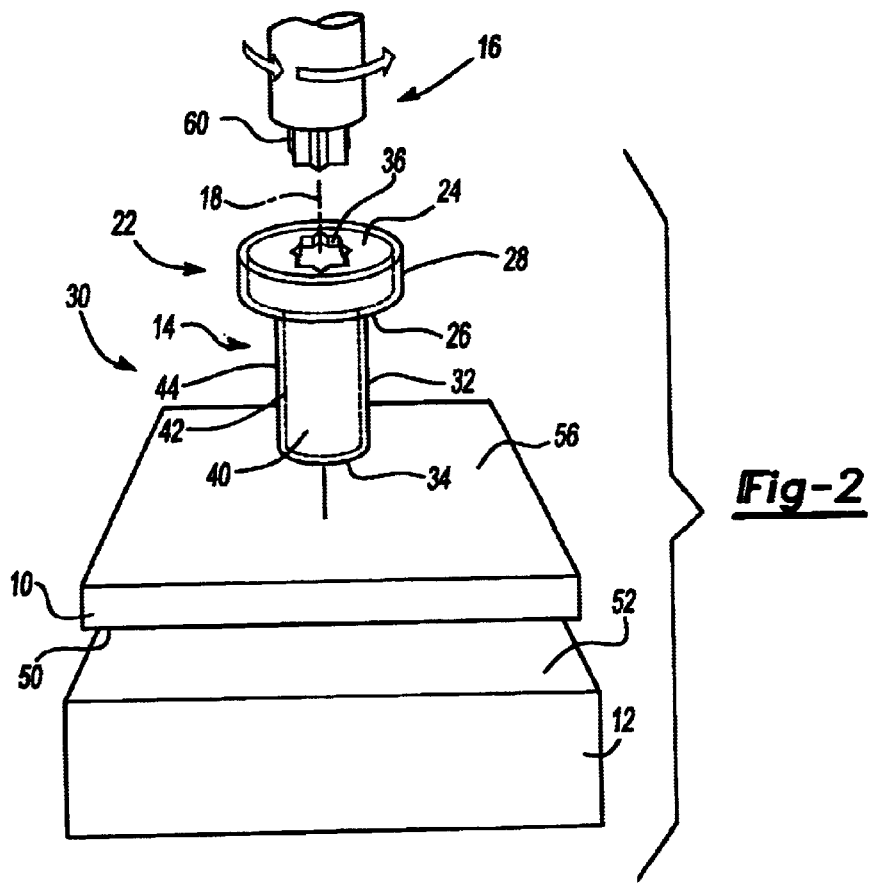
FIGS. 2 and 3 illustrate a metal sheet being attached to a metal substrate with a metal fastener.
Figure 3:
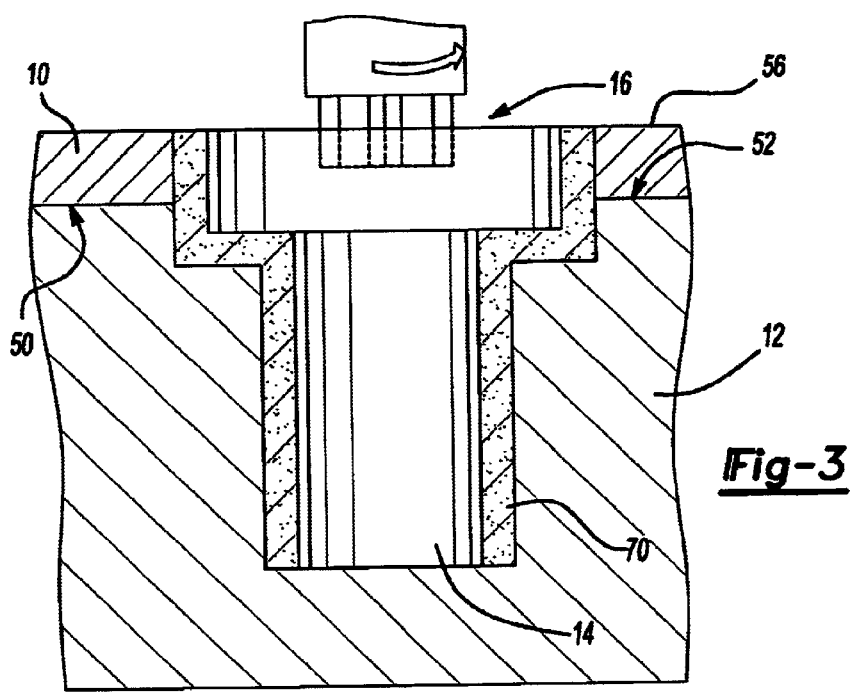

Referring to FIGS. 1–3, there is illustrated one preferred method for attaching metal members to each other in accordance with the present invention. As shown, a metal sheet 10 is attached to a metal substrate 12 with a fastener 14 that is driven through the sheet 10 and into the substrate 12 by a rotary driving apparatus 16.

As shown, the fastener 14 is substantially symmetrical about a central axis 18. The fastener 14 includes a substantially disk-shaped cap portion 22 with a top circular surface 24, a bottom circular surface 26 and a peripheral annular surface 28. The fastener 14 also includes an elongated substantially cylindrical shank portion 30 extending from the bottom surface 26 of the cap portion 22. The shank portion 30 includes an outer cylindrical surface 32 and a leading surface 34.

The top circular surface 24 of the cap portion 22 has a cavity 36 formed therein. The cavity 36 is preferably polygonal or non-circular in shape and is adapted for receiving a bit of a rotary driving tool. Alternatively, however, the cap portion 22 may include a protrusion (not shown) for mating with a cavity of a bit of a rotary driving tool. As shown, the cap portion 22 extends radially further away from the axis 18 than the shank portion 30.

Structurally, the fastener 14 is comprised of a core 40 having an outer peripheral surface 42 and a cladding 44 which covers or coats at least a portion and preferably a substantial portion of the peripheral surface 42. In FIGS. 1 and 2, the cladding 44 forms at least a portion of the driving surface 34 and the cylindrical surface 32 of the shank portion 30 and forms at least a portion of the bottom circular surface 26 and the outer annular surface 28 of the cap portion 22.

The core 40 is formed of a relatively high melting point metal or refractory metal such that the core 40 has a substantially higher melting point than the members into which it will be driven (e.g., by at least 100° Fahrenheit higher and more preferably by at least 200° Fahrenheit). Moreover, the core 40 is preferably formed of a metal of substantially greater hardness than the sheet 10 and substrate 12. Exemplary metals include high carbon steel, titanium (e.g., titanium 6Al-4V) or the like.

The cladding 44 is formed of material that can metallurgicaly bond with materials of the core 40, the sheet 10, the substrate 12 or a combination thereof. According to one embodiment, the cladding 44 is formed of a metal alloy that includes silicon (Si). According to another embodiment, the cladding 44 is formed of a metal alloy that includes zinc (Zn). As examples, the alloy that forms the cladding may be a steel/silicon alloy, a silicon/titanium alloy, a zinc/iron alloy, an aluminum/silicon alloy or a steel/aluminum/silicon alloy. In one highly preferred embodiment, the cladding 44 is formed of a silicon/titanium alloy and the core 40 is a titanium-based alloy (e.g., titanium 6Al-4V). In another highly preferred embodiment, the cladding 44 is a zinc/iron alloy, an aluminum/iron alloy or a zinc/iron/aluminum alloy and the core 40 is a high strength steel. Examples of two specific possible alloys include $Fe_3Zn_{10}$ and $FeZn_{13}$.

The cladding 44 may be applied to the core 40 by various processes such as laser powder cladding, chemical vapor deposition, sputter coating, ion implantation or the like. Subsequently, the fastener 14 may be heat treated to alloy the cladding 44 with the core 40 for forming a metallurgical bond between the cladding 44 and the core 40. In one preferred embodiment, the cladding 44 is applied to the core 40 using a process that metallurgically bonds the cladding 44 to the core 40 in a single step, such as by dipping (e.g., hot dipping) the core 40 into the material of the cladding 44 while the cladding material is in a molten state.

Whatever the method of applying the cladding 44 to the core 40, it is preferable for the cladding 44 to metallurgically bond with the core 40 such as by forming a silicon/titanium alloy or a zinc/steel alloy upon application of the cladding 44. It is also preferable for the material of the cladding 44 to metallurgically bond with the core 40 to form an alloy with the core 40 wherein the alloy has a lower melting point than the material of the core 40. Advantageously, such lowering of the melting point tends to promote greater amounts of alloying and greater alloy homogeneity.

In FIGS. 2 and 3, the metal sheet 10 is placed on the substrate 12 with a first surface 50 of the sheet 10 contacting a first surface 52 of the substrate 12 to form an interface. Additionally, the metal sheet 10 includes a second surface 56 opposite the first surface 50 wherein the second surface 56 remains exposed when the sheet 10 is placed on the substrate 12. Preferably, the sheet is from about 0.3 millimeters thick to about 8 millimeters thick at the location of attachment to a substrate. Preferably, the substrate is about 4 millimeters thick to about 25 millimeters thick or more at the location of attachment. The sheet 10 and substrate 12 may be formed of metals such as aluminum, magnesium, steel and the like. According to one preferred embodiment, the sheet 10 is formed of a wrought aluminum alloy (e.g., a 5000 series or 6000 series alloy) and the substrate 12 is formed of cast aluminum alloy.

The rotary driving apparatus 16 is preferably an automatic or semiautomatic rotation device, such as a drill, capable of rotating a bit 60 inserted in the apparatus 16. The shape of the bit 60 preferably is substantially complementary to the shape of the cavity 36 for substantial mating engagement.

During rotation, the leading surface 34 of the shank portion 30 of the fastener 14 is contacted with the exposed surface 56 of the sheet 10 and the apparatus 16 provides a force driving the fastener 14 into and through the sheet 10 and then into the substrate 12. As the fastener 14 is driven through the sheet 10 and into the substrate 12, the rotation of the fastener 14 causes the fastener 14 to frictionally contact the sheet 10 and the substrate 12 thereby at least locally melting or softening portions of the cladding 44, the sheet 10 and substrate 12. Preferably, the softened portions of the sheet 10, the substrate 12 and the cladding 44 intermix and interdissolve to alloy and form a flowable material 70 about the outer peripheral surface 42 of the core 40 of the fastener 14.

The fastener 14 is driven into the substrate 12 until the top circular surface 24 of the fastener 14 is substantially flush with the exposed second surface 56 of the sheet 10. Thereafter, the flowable material 70 solidifies for attaching the sheet 10, the substrate 12, the flowable material 70 and the fastener 14 together.

Advantageously, the flowable material 70 solidifies to form a metallurgical bond with the sheet 10 and the substrate 12 thereby attaching the sheet 10 to the substrate 12. More specifically, the softened portions of the cladding 44, the sheet 10 and the substrate 12 alloy with each other for attaching the sheet 10 to the substrate 12 with greater strength and for metallurgically bonding the sheet 10 and substrate 12 to the fastener 14. Preferably, the material of the cladding 44 metallurgically bonds with the sheet 10 and substrate 12 to form alloys with the sheet 10 and substrate 12 wherein the alloys have a lower melting point than the materials of the sheet 10 and the substrate 12. Advantageously, such lowering of the melting points tends to promote greater amounts of alloying and greater alloy homogeneity. Moreover, it is preferable to choose the material of the cladding 44 such that minimal amounts of cladding material evaporate during driving of the fastener 14.

As can be seen, the fastener 14 is only driven into the substrate 12 without necessarily being driven through the substrate 12. It will be appreciated that the present invention provides a method that is particularly useful for attaching a metal sheet to a thicker substrate where it is either undesirable or unfeasible to form a through-hole in the substrate. Moreover, the present invention provides a method of attaching a sheet to a substrate without having to pre-form holes or cavities in the sheet and substrate.

Figure 4:
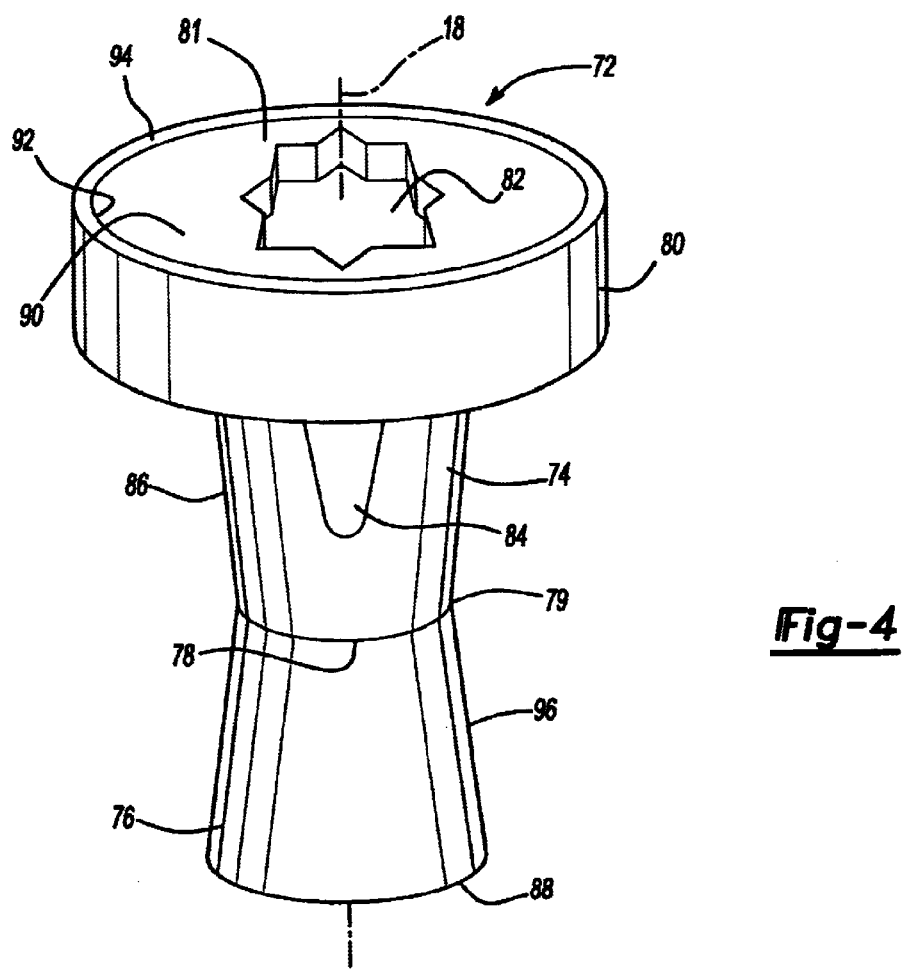
FIG. 4 illustrates an alternative fastener for attaching metal members.

Referring to FIG. 4, there is illustrated an alternative fastener 72 for attaching a sheet to a substrate. The fastener 72 includes a conical first portion 74, a conical second portion 76 (inverted relative to the conical first portion) and an interface region 78 cooperatively forming a circumferential groove 79. The conical first portion 74 preferably has a cylindrical cap 80 disposed thereon that includes an exposed surface 81 with a cavity 82 formed therein. The cavity 82 is preferably polygonal or non-circular in shape and is adapted for receiving a bit of a rotary driving tool. The first portion 74 also includes laterally opposing indentations 84 formed on an outer conical surface 86. The second portion 76 has a leading surface 88.

Additionally, the fastener 72 is formed with a core 90 having an outer peripheral surface 92 and a cladding 94 covering at least a portion and, preferably, a substantial portion of the outer surface 92 of the core 90. In FIG. 4, the cladding 94 forms the outer surfaces of both conical portions 74 and 76 as well as leading surface 88 and an outer annular surface 96 of the cap portion 80.

It will be recognized that the fastener 72 of FIG. 4 may be secured to metal members in a substantially identical manner to that described with respect to the fastener 14 of FIGS. 1 and 2. However, in addition to the metallurgical bonding attachments described above, the fastener 72 of FIG. 4 also forms a mechanical attachment. More specifically, as the fastener 72 is driven into a sheet or substrate, the flowable material formed about the fastener 72 flows into and solidifies within the circumferential groove 79 of the fastener 72. In turn, the sheet 10, the substrate 12, the flowable material 70 and the fastener 72 are attached together with a mechanical interlock or interference fit.

It shall also be recognized that fasteners of various shapes may be used to form mechanical interlocks as well as metallurgical bonds. Examples of other fasteners may be found in the following copending U.S. Patent Applications: ("A Method for Attaching Metal Members", U.S. Ser. No. 10/055,575 filed Jan. 23, 2002), ("A Method for Attaching Metal Members", U.S. Ser. No. 10/055,566 filed Jan. 23, 2002) each of which is hereby incorporated by reference for all purposes.

As an added advantage, it is contemplated that fasteners of the present invention may be driven through and into metal members relatively rapidly for attaching the metal members. Moreover, techniques may be used for rapidly and consecutively installing a plurality of fasteners wherein the fasteners are formed according to the present invention. Examples of such techniques are disclosed in the U.S. Patent Application entitled "A Method for Attaching Metal Members", U.S. patent Ser. No. 10/055,566; already incorporated herein by reference.

As can be appreciated, the present invention finds utility in a number of different applications. For example, the metal members (though illustrated as a sheet joined to a substrate) could be any suitable combination of metal parts. Thus, sheet metal, flanges, brackets, trim or the like may be joined to another metal article (e.g., vehicle frame member, vehicle rail member, cast articles, forged articles, or the like). Further, although the present invention has been discussed in terms of metal fasteners, metal sheets and metal substrates, it is contemplated that the fasteners, sheets and substrates may be formed of other materials such as plastic (e.g., thermoplastic).

It should be understood that the invention is not limited to the exact embodiment or construction which has been illustrated and described but that various changes may be made without departing from the spirit and the scope of the invention.

What is claimed is:

1. A method of attaching metal members, comprising the steps of:
    (a) providing a first metal member;
    (b) contacting the first metal member with a second metal member;
    (c) providing a metal fastener that is substantially symmetrical about a central axis, the fastener also including a core with a cladding covering at least a portion of an outer peripheral surface of the core wherein the cladding is metallurgically bonded with the core;
    (d) rotating the metal fastener about the axis; and
    (e) driving the metal fastener through the first member and into the second member during rotation of the fastener thereby inducing friction between the fastener, the first member and the second member for at least locally melting portions of the cladding, the first member and the second member to form a flowable material about the fastener wherein;
        i) the fastener is driven only partially into the second member; and
        ii) the melted portions of the cladding alloy with the melted portions of the first and second members to metallurgically bond the first and second metal members to the fastener; and
    (f) solidifying the flowable material for integrally attaching the flowable material to the first member and second member with a metallurgical bond.

2. A method as in claim 1 wherein the core of the fastener is formed of a material with a higher melting point than the first member and the second member.

3. A method as in claim 1 wherein the fastener includes a groove and the flowable material flows into the groove.

4. A method as in claim 1 wherein the fastener includes indentations for increasing friction between the fastener and the first member.

5. A method as in claim 1 wherein the first member is an aluminum-based sheet metal and the second member is an aluminum metal casting.

6. A method as in claim 1 wherein the core of the fastener is formed of high carbon steel and the cladding is formed of a zinc/iron alloy.

7. A method as in claim 1 wherein the core of the fastener is formed of high carbon steel and the cladding is formed of a aluminum/iron alloy.

8. A method as in claim 1 wherein the core of the fastener is formed of a titanium alloy and the cladding is formed of a titanium/silicon alloy.

9. A method of attaching a metal sheet to a metal substrate, comprising the steps of:
    (a) placing the metal sheet on the metal substrate such that a first surface of the sheet interfaces with a surface of the metal substrate;
    (b) providing a metal fastener having a core with an outer peripheral surface and a cladding disposed upon and metallurgically bonded with the peripheral surface wherein;
        i) the cladding is formed of a material capable of metallurgically bonding with the sheet and the substrate;
        ii) the core is formed of a material of a substantially higher melting point than the sheet and substrate; and
        iii) the fastener is substantially symmetrical about a central axis;
    (c) rotating the metal fastener about the axis;
    (d) driving the metal fastener through the metal sheet and into the metal substrate during rotation of the fastener thereby inducing friction between the fastener, the sheet and the substrate for at least locally melting portions of the cladding, the sheet and the substrate to form a flowable material about the core of the fastener wherein the fastener is driven through the sheet and is only partially driven through the substrate; and
    (e) allowing the flowable material to solidify for integrally attaching the flowable material, the fastener, the sheet and the substrate together wherein the cladding metallurgically bonds with the sheet and substrate.

10. A method as in claim 9 wherein the fastener further includes a leading surface for initially contacting an exposed surface of the sheet.

11. A method as in claim 9 wherein the fastener includes a groove and the flowable material flows into the groove.

12. A method as in claim 9 wherein the fastener includes indentations for increasing friction between the fastener and the sheet.

13. A method as in claim 9 wherein the sheet is aluminum sheet metal and substrate is an aluminum metal casting.

14. A method as in claim 9 wherein the core of the fastener is formed of high carbon steel and the cladding is formed of a zinc/iron alloy.

15. A method as in claim 9 wherein the core of the fastener is formed of high carbon steel and the cladding is formed of a zinc/iron alloy.

16. A method as in claim 9 wherein the core of the fastener is formed of a titanium alloy and the cladding is formed of a titanium/silicon alloy.

17. A method of attaching a metal sheet to a metal substrate, comprising the steps of:
    (a) placing the metal sheet on the metal substrate such that a first surface of the sheet interfaces with a surface of the metal substrate, wherein the metal sheet and the metal substrate each include the metal aluminum;

(b) providing a metal fastener having a core with an outer peripheral surface and a cladding disposed upon and metallurgically bonded with the peripheral surface wherein;

i) the cladding is formed of a material that includes zinc and is capable of metallurgically bonding with the sheet and the substrate;

ii) the core is formed of steel and has a substantially higher melting point than the sheet and substrate; and iii) the fastener is substantially symmetrical about a central axis, and the fastener includes a substantially cylindrical shank portion with a driving surface;

(c) rotating the metal fastener about the axis;

(d) contacting the driving surface of the shank portion of the fastener with a second surface of the sheet;

(e) driving the metal fastener through the metal sheet and into the metal substrate during rotation of the fastener thereby inducing friction between the fastener, the sheet and the substrate for at least locally melting portions of the cladding, the sheet and the substrate to form a flowable material about the core of the fastener wherein the fastener is driven through the sheet and is only partially driven through the substrate; and (f) allowing the flowable material to solidify for integrally attaching the flowable material, the fastener, the sheet and the substrate together wherein the cladding metallurgically bonds with the sheet and substrate.

18. A method as in claim 1 wherein the metal fastener further includes a radially enlarged cap portion and a shank portion extending from the cap portion.

19. A method as in claim 1 wherein the metal fastener further includes a drive feature at a driven end thereof for mating to a rotary driving apparatus.

20. A method as in claim 19 wherein the drive feature comprises one of a cavity and a protrusion.

* * * * *